US011636028B2

(12) United States Patent
Hicks et al.

(10) Patent No.: US 11,636,028 B2
(45) Date of Patent: *Apr. 25, 2023

(54) STRESS TEST IMPACT ISOLATION AND MAPPING

(71) Applicant: International Business Machines Corporation, Armonk, NY (US)

(72) Inventors: Andrew C. M. Hicks, Wappingers Falls, NY (US); Ryan Thomas Rawlins, New Paltz, NY (US); Dale E. Blue, Poughkeepsie, NY (US); Jacob Thomas Snyder, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,107

(22) Filed: May 6, 2022

(65) Prior Publication Data

US 2022/0261340 A1 Aug. 18, 2022

Related U.S. Application Data

(63) Continuation of application No. 16/819,329, filed on Mar. 16, 2020, now Pat. No. 11,436,132.

(51) Int. Cl.

*G06F 9/44* (2018.01)
*G06F 11/36* (2006.01)

(Continued)

(52) U.S. Cl.

CPC ........ *G06F 11/3688* (2013.01); *G06F 11/076* (2013.01); *G06F 11/3466* (2013.01); *G06F 11/3684* (2013.01); *G06F 11/3692* (2013.01)

(58) Field of Classification Search

CPC ............... G06F 11/3688; G06F 11/076; G06F 11/3466; G06F 11/3684; G06F 11/3692

See application file for complete search history.

(56) References Cited

U.S. PATENT DOCUMENTS 5,493,667 A 2/1996 Huck
6,959,431 B1 10/2005 Siels (Continued)

FOREIGN PATENT DOCUMENTS

CN 109241740 A 1/2019
EP 0786110 B1 8/2001

OTHER PUBLICATIONS

Ghandehari et al., "Identifying Failure-Inducing Cominations in a Combinatorial Test Set," IEEE Fifth International Conference on Software Testing, Verification and Validation Workshop on CT, 2012, 10 pages.

(Continued)

*Primary Examiner* — Hang Pan
(74) *Attorney, Agent, or Firm* — Cantor Colburn LLP; Teddi Maranzano

(57) ABSTRACT

A method for testing a system under test (SUT) in an active environment to identify cause of a soft failure includes recording a first difference vector by executing a set of test cases on a baseline system and monitoring performance parameters of the baseline system before and after executing the test cases. Each performance record represents differences in the performance parameters of the baseline system from before and after the execution of a corresponding test case. The method further includes, similarly, recording a second difference vector by executing the test cases on the SUT and monitoring performance parameters of the SUT before and after executing the test cases. The method further includes identifying an outlier performance record from the second difference vector by comparing the difference vec- (Continued)

tors and further, determining a root cause of the soft failure by analyzing a test case corresponding to the outlier.

20 Claims, 7 Drawing Sheets

(51) Int. Cl.
*G06F 11/07* (2006.01)
*G06F 11/34* (2006.01)

(56) References Cited

U.S. PATENT DOCUMENTS

| | | | |
|---|---|---|---|
| 7,886,242 | B1 | 2/2011 | Chakraborti et al. |
| 8,347,271 | B1 | 1/2013 | Nallasivam |
| 8,935,673 | B1 | 1/2015 | Ashkenazi |
| 9,280,442 | B1 | 3/2016 | Nicolo |
| 9,606,901 | B1 | 3/2017 | Elgarat |
| 2005/0086246 | A1 | 4/2005 | Wood et al. |
| 2005/0120274 | A1 | 6/2005 | Haghighat et al. |
| 2007/0033443 | A1 | 2/2007 | Tillmann et al. |
| 2007/0174023 | A1 | 7/2007 | Bassin et al. |
| 2008/0046791 | A1 | 2/2008 | Bicheno et al. |
| 2008/0065931 | A1 | 3/2008 | Coulter et al. |
| 2008/0215921 | A1 | 9/2008 | Branca et al. |
| 2009/0193389 | A1 | 7/2009 | Miller et al. |
| 2009/0265693 | A1 | 10/2009 | Bakowski |
| 2010/0218169 | A1 | 8/2010 | Andersen et al. |
| 2010/0287534 | A1 | 11/2010 | Vangala et al. |
| 2011/0145653 | A1 | 6/2011 | Broadfoot et al. |
| 2012/0060133 | A1 | 3/2012 | Krishnan |
| 2013/0212435 | A1 | 8/2013 | Qiu et al. |
| 2013/0339930 | A1 | 12/2013 | Xu |
| 2013/0346427 | A1 | 12/2013 | Impink |
| 2014/0025997 | A1 | 1/2014 | Heiper et al. |
| 2014/0096113 | A1 | 4/2014 | Kuehlmann et al. |
| 2014/0196011 | A1 | 7/2014 | Bostick |
| 2014/0355453 | A1 | 12/2014 | Zhang et al. |
| 2015/0067648 | A1 | 3/2015 | Sivanesan |
| 2015/0215331 | A1 | 7/2015 | Mhatre |
| 2015/0339217 | A1 | 11/2015 | Avgerinos |
| 2015/0347282 | A1 | 12/2015 | Wingfors et al. |
| 2016/0217061 | A1 | 7/2016 | Fulton et al. |
| 2016/0356851 | A1 | 12/2016 | Furman |
| 2016/0357660 | A1 | 12/2016 | Dean et al. |
| 2016/0378638 | A1 | 12/2016 | Eilam et al. |
| 2017/0060608 | A1* | 3/2017 | Raghunathan ...... G06F 11/3006 |
| 2017/0228307 | A1 | 8/2017 | Edwards et al. |
| 2018/0246803 | A1 | 8/2018 | Zhang |
| 2018/0293072 | A1 | 10/2018 | Jhi |
| 2019/0155717 | A1 | 5/2019 | Hess et al. |
| 2019/0163614 | A1 | 5/2019 | Meliou et al. |
| 2019/0361799 | A1 | 11/2019 | Wojciak et al. |
| 2020/0073788 | A1 | 3/2020 | Saha et al. |
| 2020/0125732 | A1 | 4/2020 | Iyer et al. |
| 2020/0192789 | A1 | 6/2020 | Peng et al. |
| 2020/0285570 | A1 | 9/2020 | Knaack et al. |
| 2021/0098299 | A1 | 4/2021 | Holsteyns et al. |
| 2021/0286710 | A1 | 9/2021 | Hicks et al. |
| 2021/0286711 | A1 | 9/2021 | Hicks et al. |
| 2021/0286712 | A1 | 9/2021 | Hicks et al. |
| 2021/0286713 | A1 | 9/2021 | Hicks et al. |
| 2021/0286714 | A1 | 9/2021 | Hicks et al. |

OTHER PUBLICATIONS

Harrell, “Orthogonal Array Testing Strategy (OATS) Technique,” Seilevel, URL: http://www.51testing.com/ddimg/uploadsoft/20090113/OATSEN.pdf, Received: Sep. 23, 2021, 9 pages.
Kuhn et al., “Combinatorial Software Testing,” Software Technologies, IEEE Computer Society, 2009, pp. 94-96.
Mailewa, “Reducing Software Testing Time with Combinatorial Testing and Test Automation,” St. Cloud State University, Culminating Projects in Computer Science and Information Technology, Jun. 2015, 94 pages.
Maughan, “Test Case Generation Using Combinatorial Based Coverage for Rich Web Application,” Utah State University, 2012, All Graduate Theses and Dissertations, 1405, 40 pages.
Sabharwal et al., “A novel approach for deriving interactions for combonatorial testing,” Elsevier, Engineering Science and Technology, an International Journal, Jun. 27, 2016, pp. 59-71.
List of IBM Patents or Patent Applications Treated as Related; Date Filed: May 6, 2022, 2 pages.

* cited by examiner

600

610 620A 630 620B

| | | | | | | | |
|---|---|---|---|---|---|---|---|
| **Test 1** | **Test 2** | ... | | | | **Test (n-1)** | **Test n** |
| PR 1 | PR 2 | ... | | | | PR (n-1) | PR n |
| Diff 1 | Diff 2 | ... | | | | Diff (n-1) | Diff n |
| Base 1 | Base 2 | ... | | | | Base (n-1) | Base n |
| Diff 1 | Diff 2 | ... | | | | Diff (n-1) | Diff n |

FIG. 6

STRESS TEST IMPACT ISOLATION AND MAPPING

BACKGROUND

The present invention relates to testing of a computer program and, more specifically, testing environmental conditions in a system on which the computer program is being executed.

Computerized devices control almost every aspect of our life, from writing documents to controlling traffic lights. However, computerized devices are often error-prone, and thus require a testing phase in which the errors should be discovered. The testing phase is considered one of the most difficult tasks in designing a computerized device. The cost of not discovering an error may be enormous, as the consequences of the error may be disastrous. Coverage tools for checking software provide a measure of how well the software being evaluated has been exercised during testing and thereby give a level of assurance that the software is of high quality.

SUMMARY

According to one or more embodiments of the present invention, a method for testing a system under test (SUT) in an active environment to identify cause of a soft failure includes generating, by a testing system, several test cases for testing the SUT. The test cases are generated based on a coverage model of the SUT. The coverage model includes several attributes. The method further includes recording, by the testing system, a first difference vector by executing the test cases on a baseline system and monitoring performance parameters of the baseline system before and after executing the test cases. The first difference vector includes performance records corresponding to the test cases respectively. Each performance record represents differences in the performance parameters of the baseline system from before and after the execution of a corresponding test case. The method further includes recording, by the testing system, a second difference vector by executing the test cases on the SUT and monitoring performance parameters of the SUT before and after executing the test cases. The second difference vector also includes performance records corresponding to the test cases respectively. Each performance record represents differences in the performance parameters of the SUT from before and after the execution of a corresponding test case. The method further includes identifying, by the testing system, an outlier performance record from the second difference vector by comparing the first difference vector and the second difference vector. The method further includes determining, by the testing system, a root cause of the soft failure of the SUT by analyzing a test case corresponding to the outlier performance record.

According to one or more embodiments of the present invention, a system includes a memory device, and one or more processing units coupled with the memory device, the one or more processing units performs a method for testing a system under test (SUT) in an active environment to identify cause of a soft failure includes generating, by a testing system, several test cases for testing the SUT. The test cases are generated based on a coverage model of the SUT. The coverage model includes several attributes. The method further includes recording a first difference vector by executing the test cases on a baseline system and monitoring performance parameters of the baseline system before and after executing the test cases. The first difference vector includes performance records corresponding to the test cases respectively. Each performance record represents differences in the performance parameters of the baseline system from before and after the execution of a corresponding test case. The method further includes recording a second difference vector by executing the test cases on the SUT and monitoring performance parameters of the SUT before and after executing the test cases. The second difference vector also includes performance records corresponding to the test cases respectively. Each performance record represents differences in the performance parameters of the SUT from before and after the execution of a corresponding test case. The method further includes identifying an outlier performance record from the second difference vector by comparing the first difference vector and the second difference vector. The method further includes determining a root cause of the soft failure of the SUT by analyzing a test case corresponding to the outlier performance record.

According to one or more embodiments of the present invention, a computer program product includes a computer-readable storage medium having computer-executable instructions stored thereupon, which when executed by a processor cause the processor to perform a method for testing a system under test (SUT) in an active environment to identify cause of a soft failure includes generating, by a testing system, several test cases for testing the SUT. The test cases are generated based on a coverage model of the SUT. The coverage model includes several attributes. The method further includes recording a first difference vector by executing the test cases on a baseline system and monitoring performance parameters of the baseline system before and after executing the test cases. The first difference vector includes performance records corresponding to the test cases respectively. Each performance record represents differences in the performance parameters of the baseline system from before and after the execution of a corresponding test case. The method further includes recording a second difference vector by executing the test cases on the SUT and monitoring performance parameters of the SUT before and after executing the test cases. The second difference vector also includes performance records corresponding to the test cases respectively. Each performance record represents differences in the performance parameters of the SUT from before and after the execution of a corresponding test case. The method further includes identifying an outlier performance record from the second difference vector by comparing the first difference vector and the second difference vector. The method further includes determining a root cause of the soft failure of the SUT by analyzing a test case corresponding to the outlier performance record.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts example performance record vectors, according to one or more embodiments of the present invention.

Figure 1:
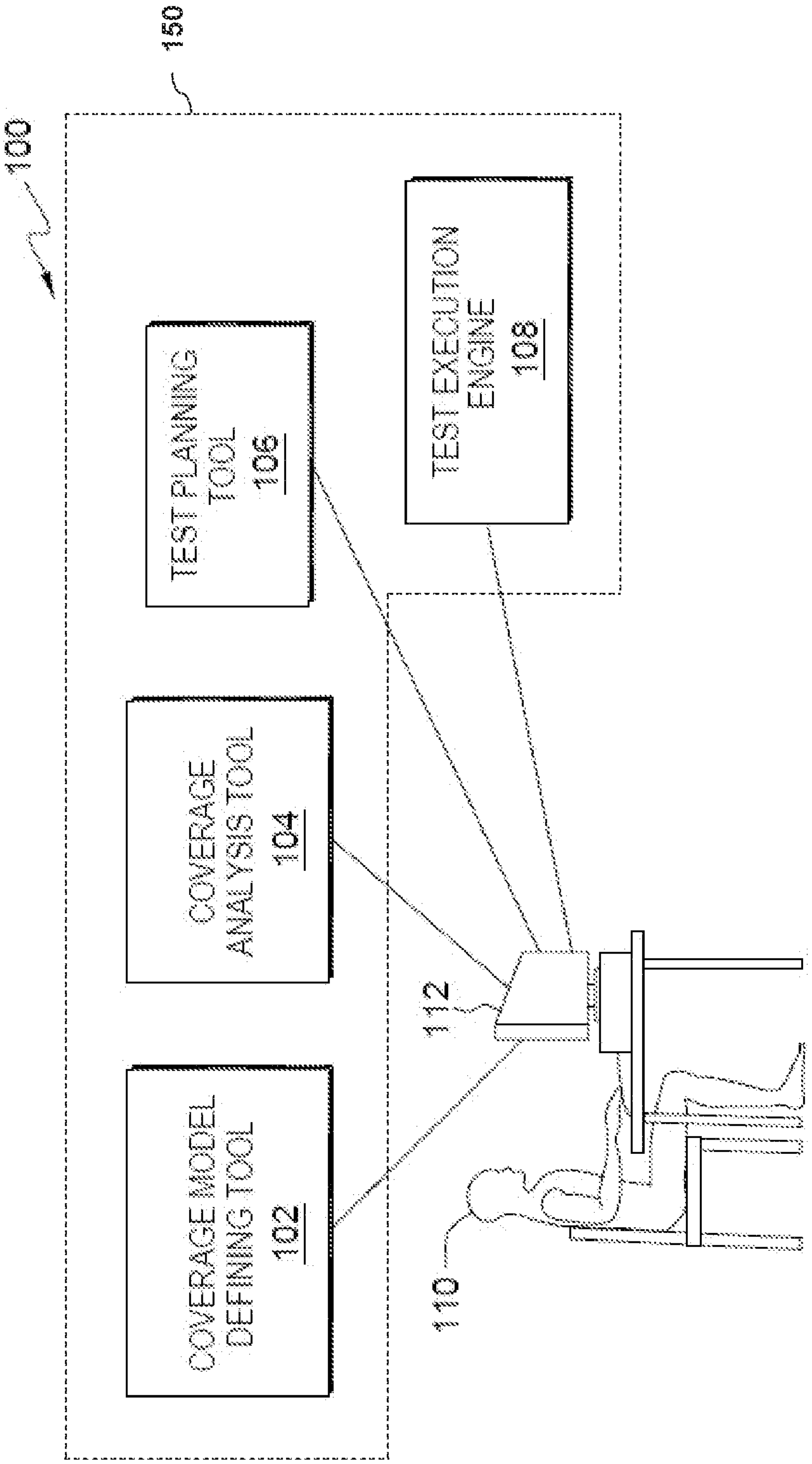
FIG. 1 shows a schematic illustration of a computerized environment in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

When testing a system (i.e., a system under test (SUT)), it is observed that some errors (also referred to herein as "bugs") are not surfaced consistently due to a requirement of specific environmental or timing circumstances. For example, in the case of a software SUT, the circumstances can include one or more parameters of a computer system on which the software is being executed. For example, the parameters can include settings of the computer system, other software being executed on the computer system, a hardware configuration of the computer system, and the like. In a similar manner, in the case of a hardware SUT, the configuration of a system of which the hardware SUT is a part of can affect the environmental conditions. In other words, particular errors in the SUT can be a result of the system state and not the quality of the SUT itself. Such errors are sometimes referred to as "soft failures." Identifying such conditions that can lead to soft failures is a technical challenge. Additionally, identifying the soft failures, i.e., determining that an error is a soft failure can also be a technical challenge.

Embodiments of the present invention address such technical challenges. According to one or more embodiments of the present invention, a minimal set of test cases for a SUT are executed on the system. It should be noted that the system is different than the SUT; the SUT is being executed using the system. The minimal set of test cases can be generated using combinatorics test designing (CTD). Errors can be identified based on a subset of tests that fail from that minimal set. Further, according to one or more embodiments of the present invention, inverse CTD is used to localize the fault in the system.

According to one or more embodiments of the present invention, CTD is performed with respect to an interaction requirement, such as a pair-wise interaction, n-tuple interaction, or any other. The test plan may provide for sufficient coverage tasks that assure that the interaction requirement is fulfilled. In some exemplary embodiments, test planning is based on a modeling of the test space using a functional coverage model. The test space can represent inputs, scenarios, configurations, the application's internal state, or any other aspect that might need to be tested. The functional coverage model may include a set of functional attributes. In other embodiments of the present invention, the coverage model can include one from a number of types of coverage known in the art, such as statement coverage, line coverage, condition coverage, path coverage, method coverage, and the like. The type of coverage does not affect identifying the soft failures.

Further, with respect to test planning, a test-space may define potential tests that may be executed on the SUT. A test can be associated with exactly one potential test, as opposed to coverage tasks. In some exemplary embodiments of the present invention, several different tests may hold the same potential test.

In some exemplary embodiments of the present invention, the motivation for the approach of CTD is that most bugs depend on the interaction between a small number of functional attributes. CTD algorithms may also deal with scalability issues. The CTD algorithms may assume that the combinations space is too large to be represented explicitly, and they use various techniques to try to generate an optimized test plan without explicitly enumerating all possible combinations. Examples of such algorithms may be a reduction to the orthogonal arrays or covering array problems. Those techniques are limited in the type of restrictions they allow on the value combinations, or in the type of requested interaction level, and still hit scalability issues as the number of model variables increases.

Despite these reduction efforts, once the SUT has been implemented, new features are typically requested and added as users exercise the functionality of the system. New test cases are created as the new features are added. Sets of test cases are, therefore, maintained for the SUT to ensure that previous functionality still works, that new functionality works and that the new functionality does not adversely affect the old functionality. These test case sets are termed regression test cases, and the activity of testing the SUT to ensure conformance with legacy requirements is typically termed regression testing.

Generally, at least some of the regression test case sets are created and maintained manually over the life of the SUT. They are manually selected based on the number of tests that can be run in an allotted amount of time, tests that exercise the most important features of the SUT, and tests that have historically exposed the greatest number of problems in the SUT when introducing new features, or other such reasons. A drawback of conventional regression testing is that some of the additional test cases repeat test actions that are covered by other test cases in the regression test case set. This is the penalty associated with the incremental addition of test cases. For a large, complex project, using the manual iterative method of adding test cases to the regression test case set can result in a large amount of duplicate test actions. Such technical challenges are also addressed by the technical solutions facilitated by embodiments of the present invention.

The technical challenges arise because without the ability to automatically regenerate the test set in response to changes made to the requirements, the testing effort proceeds inefficiently. Initially, it is possible to manually select a test set that is close to the optimal set of test cases from a small requirements model. The requirements model, however, grows as new features and capabilities are added to the SUT. Once the requirement model is large, manually selecting a close to an optimal set of test cases is technically challenging, if not impossible. In one known method, the original set of test cases is augmented with test cases that exercise the new parts of the requirements model. Over time, using this approach, there will be extensive redundancy between the test cases. The same scenarios or scenario fragments are included in a large proportion of the test cases. Other scenarios and scenario fragments will be ignored entirely and will not be included in any test case. Overall, there will be a large number of test cases, far more than necessary for coverage, and the coverage achieved by this large test set will be poor. Thus, a further technical challenge is to reduce this redundancy by removing test cases that cover identical execution paths. As described further, embodiments of the present invention address such technical challenges.

Referring now to FIG. 1, showing a schematic illustration of a computerized environment in accordance with embodiments of the present invention. A computerized environment 100 may include one or more computerized tools. It should be noted that the depiction is one possible example of a block diagram and that some components may not be depicted for clarity. The computerized tool includes a testing system 150 that is used to test other systems.

In one or more embodiments of the present invention, a operator 110, such as a developer, a QA staff member, a tester, a designer, a verification engineer or the like, may interact with the testing system 150. The operator 110 may utilize a Man-Machine Interface (MMI) 112 such as a terminal, a display, a keyboard, an input device or the like.

In one or more embodiments of the present invention, the testing system 150 includes a coverage model defining tool 102, a coverage analysis tool 104, a test planning tool 106, and a test execution engine 108, among other components. In some exemplary embodiments of the present invention, a coverage model defining tool 102 may be utilized to define the test coverage model, such as a functional coverage model, or the like. In some exemplary embodiments of the present invention, the operator 110 may define the attributes that are to be tested, for example, the functional attributes in case a functional coverage is being tested. In some exemplary embodiments of the present invention, a similar tool may be utilized to define a test-space. In some exemplary embodiments, the coverage model may be adapted to be utilized as a test model.

In some exemplary embodiments of the present invention, a test execution engine 108 may be utilized to test the SUT. It will be noted that the SUT may be hardware, firmware, software, combination thereof, or any other type of computerized device. The test execution engine 108 may be a simulation-based verification tool, a test-generation platform, or the like. The test execution engine 108 may be operatively coupled to a test planning tool 106 and configured to perform testing in accordance with the test plan. In some exemplary embodiments, the test planning tool 106 may provide the tests for the test execution engine 108 to perform. It will be noted that dynamic verification is a broader concept than testing the SUT, and it further includes test planning, coverage analysis and the like. The test execution engine 108 provides only one aspect of the entire scope of operations that may be performed during dynamic verification and should not be used to construe the term "dynamic verification" narrowly.

In some exemplary embodiments of the present invention, a coverage analysis tool 104 is configured to measure coverage of the test space for the SUT based on the dynamic verification performed by the test execution engine 108. For example, the coverage analysis tool 104 can be a functional coverage analysis tool. The coverage analysis tool 104 provides a coverage measurement, such as a portion of the coverage test-space or of the defined test plan, indicative of coverage tasks that were covered during dynamic verification performed by the test execution engine 108. The operator 110 may review the coverage measurement and/or the list of covered tasks.

In some exemplary embodiments of the present invention, a test planning tool 106 may define a test plan to be covered. In some exemplary embodiments of the present invention, the test plan may be a set of coverage tasks to be covered. In some exemplary embodiments of the present invention, the test planning tool 106 may provide tests that are likely to cover the test plan, such as based on a test benchmark stored in a datastore which includes tests that are known/estimated to cover specific aspects of the SUT. As another example, the test planning tool 106 is configured to generate tests so as to cover coverage tasks. The operator 110 may review the test plan, the selected test or the like. In some exemplary embodiments of the present invention, the operator 110 may provide parameters for the test planning tool 106 to use in determining the objective of the test plan, such as a desired interaction level. Embodiments of the present invention enable the elimination of any redundancy in the generated tests.

While the depiction in FIG. 1 has been described with specific components including the coverage model defining tool 102, coverage analysis tool 104, test planning tool 106 and the test execution engine 108, embodiments of the present invention are not limited to these components or system configurations and can be implemented with other system configuration employing fewer or additional components.

Figure 2:
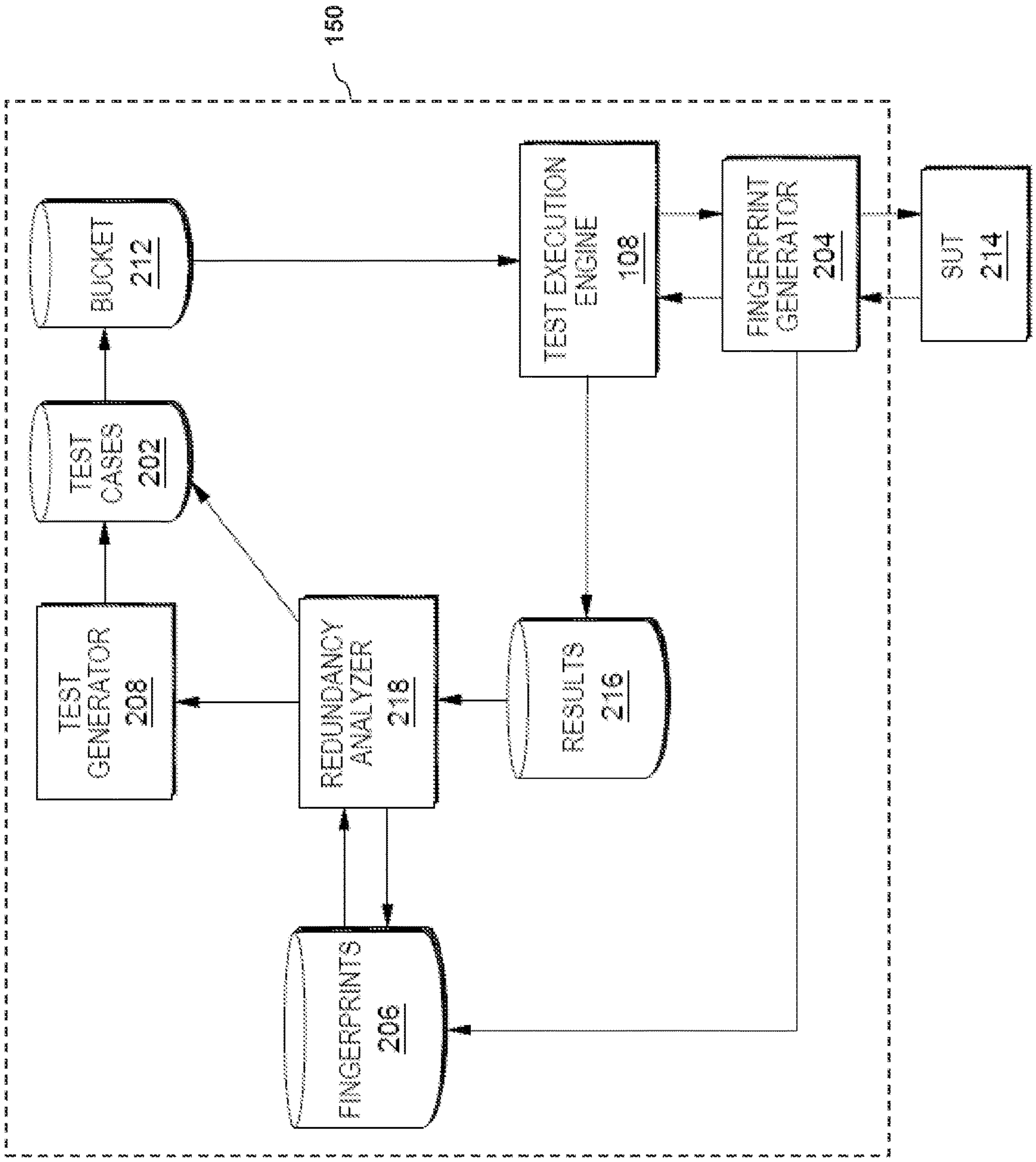
FIG. 2 is a block diagram representing modules providing a testing infrastructure according to an embodiment of the invention.

FIG. 2 is a block diagram representing modules providing a testing infrastructure according to an embodiment of the invention. More specifically, the infrastructure includes a test generator 208. The test generator 208 accesses a test infrastructure, such as a repository of test cases 202, which stores suites of test cases available to verify the correctness of the SUT 214. Each test case specifies an input to be applied to the SUT 214 and the expected response that should be returned in response to this input (to indicate its correct operation). Typically, the test cases are organized into sets (test suites), for example, each test suite for a different component of the SUT 214.

The test generator 208 creates an execution bucket for each run of the test on the SUT 214. The bucket specifies the operations to be performed for running the desired test cases in a machine-readable language (such as XML-based). Particularly, in the case of a complete test, all the available test cases are executed on each component of the SUT 214; conversely, in the case of a regression test, the execution is limited to a subset of selected test cases. The bucket so obtained can be saved into a file.

A test execution engine 108 controls the execution of the bucket read from the file. For each test case of the bucket, this involves the application of the corresponding input to the SUT 214. In response thereto, the SUT 214 returns a corresponding output to the test execution engine 108. The test execution engine 108 determines the result of the test case by comparing its output with the corresponding expected response (extracted from the file, for example). The result of the test case (i.e., positive when the two values match and negative otherwise) is saved into a log. For example, this may be achieved by means of a standard Test Tracking Tool (TTT). The results of the (current) run of the test are available in the log for their analysis.

For a large, complex SUT 214, the test case infrastructure 202 can contain a large amount of duplicate test actions/test cases. In accordance with certain embodiments of the present invention, one technique developed to address these challenges incorporates the use of a fingerprint repository 206 with a store of information including a set of fingerprints that correspond to a plurality of regression tests stored in the test repository 202. In one embodiment, the fingerprints are generated by a fingerprint generator 204. For instance, the fingerprint repository 206 can include fingerprints of most, if not all, of the tests stored in the test repository 202 and a reference to where copies of the test are located throughout the test infrastructure, similar to an index in a book. Each fingerprint uniquely identifies a specific code path covered by a corresponding test case. In this manner, the system can identify fingerprints (and corresponding tests) that are redundant, and in some cases duplicate.

According to embodiments of the present invention, processing of the results 216 of the regression tests generated by the test generator 208 and executed by the test execution engine 108 may include determination of a code path traversed during execution of each generated regression test and generation of a fingerprint for each executed regression test based at least in part on the code path. In some embodiments of the present invention, these steps may be performed by the fingerprint generator 204.

A redundancy analyzer 218 compares fingerprints corresponding to all test cases generated by the test generator 208 to a plurality of fingerprints stored in the fingerprint repository 206. The redundancy analyzer 218 provides a list of the regression test cases generated by the test generator 208 that have matching fingerprints with one or more fingerprints stored in the fingerprint repository 206. This information is used to select and discard the duplicate test cases from the test repository 202 (as described below).

Figure 3:
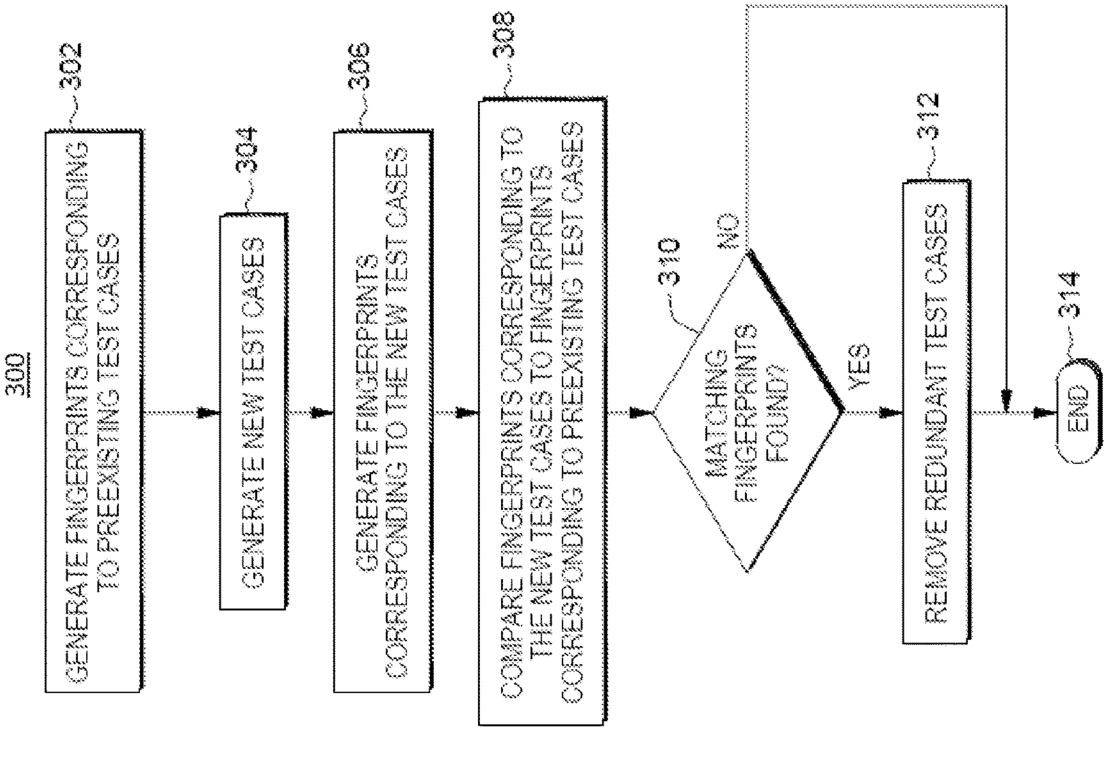
FIG. 3 shows a flowchart of a method for stress test impact isolation and mapping, in accordance with one or more embodiments of the present invention.

FIG. 3 shows a flowchart of a method 300 for reducing test cases by eliminating redundant tests, in accordance with embodiments of the present invention. It should be noted that each operation of the method 300 depicted in FIG. 3 can be performed by one or more of the modules or the like depicted in FIG. 1, or FIG. 2, whose operation will be described in more detail hereinafter. These program modules may be implemented in any combination of hardware, software, and/or firmware. In certain example embodiments of the present invention, one or more of these program modules may be implemented, at least in part, as software and/or firmware modules that include computer-executable instructions that when executed by a processing circuit cause one or more operations to be performed. A system or device described herein as being configured to implement example embodiments of the present invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

At block 302, the fingerprint generator 204 may generate fingerprints for each respective test that has been run on the SUT 214. The fingerprint generator 204 may retrieve the preexisting regression tests from one or more datastores, such as test repository 202. In example embodiments of the present invention, these preexisting regression tests may have been executed on source code, which may also be retrieved from the test repository 202. In example embodiments of the present invention, inputs to the source code to be tested may be modeled as a collection of attribute-value pairs. As such, in certain example embodiments, each regression test case may be a test case to test the operation of the source code of the SUT 214 with respect to a particular combination of attribute values. In example embodiments of the present invention, the fingerprint generator 204 may generate fingerprints for each executed regression test based at least in part on the code path traversed by the source code covered by the corresponding test case.

At block 304, the test generator 208 may generate one or more tests (e.g., a set of regression tests) to run on the SUT 214. In one embodiment, the test generator 208 may utilize CTD to determine a set of tests to be executed. In one embodiment, the test generator 208 may be given a description of a test space in the form of variables, their respective values, and possibly restrictions on the values combinations. In one exemplary embodiment, the test generator 208 may select a subset of the possible tests that ensures coverage of all valid combinations of every two attributes (or every three, or four, etc.). Many tools and algorithms exist for CTD such as those disclosed in Grindal, M., Offutt, J., Andler, S. F. "Combination testing strategies: a survey". Softw. Test, Verif. Reliab 15(3), 167-199 (2005), and the disclosed embodiment may utilize any of one of them.

In one or more embodiments of the present invention, the test generation may be performed by selecting a subset of the tests that would maintain 100% n-wise coverage with respect to the tested test space, and therefore maintaining the n-wise coverage metric with respect to the valid test space. In some exemplary embodiments of the present invention, at block 304, the coverage analysis tool 104 may be operative to determine a subset of the possible combinations of values. The subset of the possible combinations of values is with respect to the covered test space defined by the coverage model determined by the coverage model defining tool 102. The most common criterion for test selection is code coverage, i.e., select a subset of the tests that cover code that has recently changed, for example. As noted earlier, the coverage model can be functional code coverage model.

According to one or more embodiments of the present invention, at block 306, after the test execution engine 108 executes the generated tests, the fingerprint generator 204 generates fingerprints corresponding to the executed tests. For example, each fingerprint uniquely identifies the code path traversed during execution of a corresponding regression test. In some exemplary embodiments of the present invention, the fingerprint generation algorithm employed by the fingerprint generator 204 generates a fingerprint that identifies not only the breakpoints encountered during traversal of a code path and the number of times each such breakpoint is encountered, but also the order in which the encounters occur. Thus, if execution of two different regression tests results in code paths that encounter the same breakpoints the same number of times but in different orders, the respective fingerprint generated for each regression test will uniquely identify the particular order in which breakpoint encounters occur for that regression test.

At block 308, the redundancy analyzer 218 compares the fingerprints generated at block 306 with a plurality of fingerprints stored in the fingerprint repository 206. The redundancy analyzer 218 attempts to find exact matches. As a non-limiting example, if the fingerprint generator 204 employs a string-based algorithm and generates the fingerprint <ABABCDCDE> for a corresponding regression test, at block 308 the redundancy analyzer 218 determines whether there are any <ABABCDCDE> fingerprints in the fingerprint repository 206. It should be noted, each element of the string <ABABCDCDE> identifies a corresponding breakpoint that is encountered; the number of times that the same element appears in the string indicates the number of times the corresponding breakpoint is encountered; and the ordering of the elements in the string indicates the order in which the breakpoints are encountered. Once the redundancy analyzer 218 identifies matching fingerprints, it also identifies corresponding test cases stored in the test repository 202 based on the identified fingerprint information. It should be noted that in other embodiments of the invention, the fingerprint is represented using other format, such as a hash key, or any other format.

If the redundancy analyzer 218 finds no matching fingerprints (decision block 310, No branch), the disclosed method ends at block 314. Responsive to finding one or more matching fingerprints (decision block 310, Yes branch), at block 312, the redundancy analyzer 218 removes the redundant test cases associated with the matching fingerprint from the test repository 202. In other words, if one or more of older test case is associated with a fingerprint that matches the fingerprint of one of the newer generated CTD tests, then the older case can be removed from the test repository 202. This reduction of redundant test cases advantageously alleviates maintenance requirements on the test infrastructure as older test cases are gradually cycled out.

However, even such a reduced set of tests cannot be used on a "live" environment 100, such as in an active data center that is being used by consumers/customers. The live environment is not a "clean" environment as discussed earlier, and in one or more embodiments of the present invention, the live environment is one in which soft failures are being experienced. Hence, to address the technical challenges, in one or more embodiments of the present invention, the reduced set of tests is further reduced so that a minimal set of test cases can be used to test the live environment 100. This minimal set is even more reduced than a typical pairwise reduction set. In an environment that experiences soft failures, embodiments of the present invention treat all services as being in a fragile state. Hence, embodiments of the present invention use the minimal set of tests, instead of the pairwise tests, to facilitate identifying the fault(s) that are causing the soft failures and repairing the fault(s) instead of further stressing the environment 100 and causing it to fail completely (crashing).

Embodiments of the present invention address such technical challenges. In one or more embodiments of the present invention, after mapping the testing space, a regression bucket is executed to remove any tests that exceed a particular level of intensity that can cause the SUT 214 to experience one or more soft failures, which in turn can result in a system failure. In one or more embodiments of the present invention, a level of intensity of a test can be determined by an amount of time to run the test. Alternatively, or in addition, the level of intensity can be based on a number of lines of code of the SUT 214 executed. Alternatively, or in addition, the level of intensity of the test can be based on a number of computer resources used during execution of the test, where the computer resources can include number of hardware components, number of memory locations, number of external application programming interface (API) calls, and the like. By removing the tests that exceed a predetermined level of intensity, one or more embodiments of the present invention facilitate determining a minimal set of test cases that provide a lightweight combinatoric splattering of tests for the SUT 214.

Further, the same set of tests are executed on a baseline system and the SUT 214. The baseline system is a "clean" system that has a known configuration, both software configuration and hardware configuration. By comparing successful tests run on the baseline system to the same set of tests run on the SUT 214, one or more embodiments of the present invention can identify any tests that executed in a different manner on the SUT 214. The variation can include different execution times, different processor usage, different memory usage, different disk usage, different network usage, different power usage, and the like. Such variations can be treated as failures considering that such variations may be resulting in the soft failures on the SUT 214. Embodiments of the present invention further include using inverse CTD to isolate said failures.

When the SUT 214 is experiencing soft failures, it is already under stress, and any additional stress can exacerbate such fragile situation and result in service outages or loss of data. Thus, it is crucial that the symptoms of the soft failures are diagnosed quickly and efficiently. Accordingly, embodiments of the present invention provide a lightweight combinatoric splattering approach that facilitates, without adding undue stress on the SUT 214, pinpointing the areas of the SUT 214 that can be causing the soft failures state.

Figure 4:
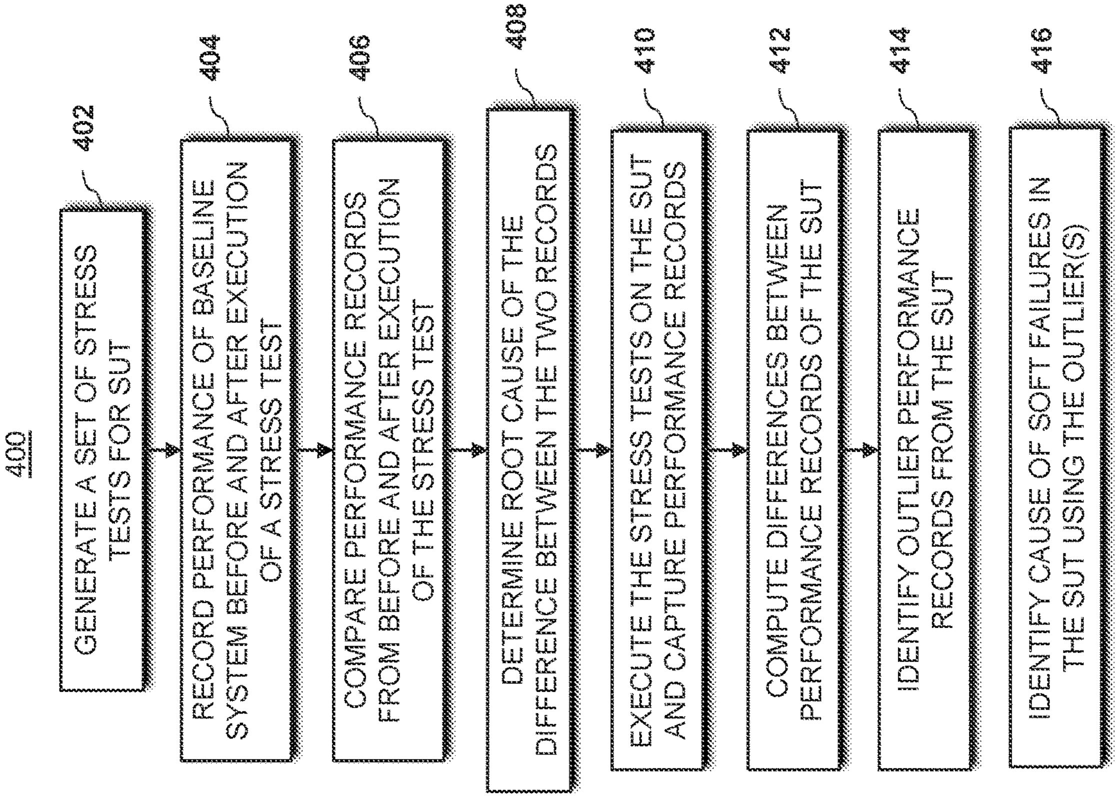
FIG. 4 depicts a flowchart of a method for generating a minimal set of tests for diagnosing portions of a system that are causing soft failures when executing a system under test according to one or more embodiments of the present invention.

FIG. 4 depicts a flowchart of a method 400 for stress test impact isolation and mapping according to one or more embodiments of the present invention. The method 400 includes generating test cases 202 to stress test the SUT 214, at block 402. Such stress test cases can cause one or more specific resources of the SUT 214 to be used rigorously to determine whether that/those specific resources cause a soft failure or defect when executing the SUT 214. For example, a stress test case can allocate memory buffers that occupy all available memory, can cause an interrupt to occur repeatedly, can cause processor usage to be substantially 100%, transfer files with size exceeding a certain threshold value, and other such operations that can stress one or more resources of the SUT 214.

The test cases 202 can be attribute-value pairwise tests. The pairwise tests can be generated using CTD in one or more embodiments of the present invention. Any other technique can be used for generating the pairwise tests. In one or more embodiments of the present invention, generating the tests includes selecting a reduced set of the pairwise tests to provide maximum test coverage for the SUT 214. In one or more embodiments of the present invention, the test cases are generated using techniques other than CTD.

The method 400 further includes executing the set of test cases 202 on a baseline system and recording baseline performance after execution of each of the stress test cases, at block 404. In one or more embodiments of the present invention, a performance record is also captured before execution of each test case. Alternatively, or in addition, a performance record is captured prior to initiation of execution of the set of test cases 202, i.e., before any stress test case is executed.

Figure 5:
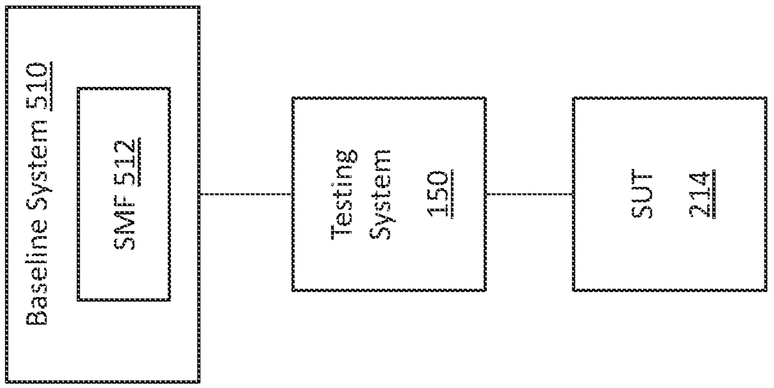
FIG. 5 depicts a block diagram representing a system for detecting soft failures in a system under test according to one or more embodiments of the present invention.

FIG. 5 depicts a block diagram of a system 500 for diagnosing causes of soft failures when executing the SUT 214 according to one or more embodiments of the present invention. The system 500 includes the testing system 150, the SUT 214, and a baseline system 510. The baseline system 510 is a replica of the SUT 214, but with a known hardware and software configuration that can be controlled by the operator 110. For example, the hardware resources and software installed on the baseline system 510 are cataloged and a performance of the test cases 202 on the baseline system 510 is measured and known. Here, the baseline system 510 represents a clean environment in which the soft failures are not experienced, that are experienced by the SUT 214.

In one or more embodiments of the present invention, the baseline system 510 includes a system management facilities (SMF) module 512. The SMF 512 monitors and records performance parameters of the baseline system 510 in a continuous manner. The testing system 150 can access such records of performance parameters, for example, using an application programming interface (API) or any other techniques. The performance parameter records can be updated after one or more operations on the baseline system 510, such as ingesting data, operating system activity, storing/reading data to/from memory and/or from storage disks, receiving/transmitting data over one or more communication networks, accessing one or more I/O ports, internal devices, external devices, interrupt requests, etc.

In one or more embodiments of the present invention, the performance records captured before and after the execution of a test case 202 can include processor usage, memory usage, network usage, disk usage, power usage, and other such event activity of the baseline system 510. The testing system 150 can further record an execution time of the test case 202 on the baseline system 510.

Referring back to the flowchart in FIG. 4, the method 400 further includes comparing, by the testing system, a first performance record that is captured before executing the stress test case and a second performance record that is captured after execution of the stress test case, at block 406. The differences in the two performance records are identified. For example, the difference can identify that the memory usage changed by X %, or that X amount of memory was used by the test case. Alternatively, or in addition, some other performance parameter, such as processor usage, can also show a difference in the before and after performance records.

In one or more embodiments of the present invention, instead of comparing a pair of performance records from immediately before and after executing the stress test case, the performance records that are captured after execution of each test case in the set of stress test cases 202 are compared with the performance record that was captured prior to initiating the execution of the test cases 202. Accordingly, all the performance records corresponding to the stress test cases are compared to a single baseline performance record in this case.

In one or more embodiments of the present invention, the comparison can be performed using vector based computation. FIG. 6 depicts an example vector representation of performance records according to one or more embodiments of the present invention. In the depicted implementation, the performance records PR1, PR2, . . . PRn, corresponding to n stress test cases in the set of test cases 202 are stored in the form of a performance record vector 610. Each entry in the performance record vector 610 is a performance record with multiple performance parameters that are recorded.

Accordingly, in the performance record vector 610, each entry itself is a multi-dimensional data point. In one or more embodiments of the present invention the performance record vector stores the performance records in the chronological order of execution of the corresponding test cases.

Another vector, a difference vector 620, can be computed that includes multiple performance records. Each entry Diff1, Diff2, . . . Diffn in the difference vector 620 is a difference between the corresponding performance record from the vector 610 and a baseline performance record. The corresponding baseline performance records are accumulated in a baseline vector 630. The baseline vector 630 can include multiple instances of the same baseline performance record that was captured prior to initializing execution of the test cases 202 in one or more examples. Alternatively, the baseline performance records are the performance records that are captured prior to execution of each test case.

Referring back to the flowchart in FIG. 4, the method 400 further includes determining the cause of the difference in each performance record from the difference vector 620, at block 408. If the stress test case was generated using CTD, known inverse CTD techniques can be used to determine the root cause. Alternatively, in case CTD was not used to generate the stress test case, other corresponding reverse analysis is used to determine the root cause of the performance change caused by the stress test case. In one or more examples, the change in performance that is identified can be different and in addition to the primary stress/rigor that the stress test is generated for. For example, the stress test case may be created to test memory performance by transferring a large file. However, for such a stress test case to execute successfully, network performance, processor usage, storage usage, or other such parameters may also be stressed. Accordingly, the comparison can identify such other parameters that are being stressed by the stress test cases, which can cause the soft failure. Correlating the changes to specific test cases facilitates to isolate and map the impact and symptoms resulting from the set of stress test cases 202.

Further, the method 400 includes executing the stress test cases 202 on the SUT 214 and capturing the SUT performance record vectors from the SUT 214, at block 410. The testing system 150 captures the baseline vector 630 and performance record vector 610 for the SUT 214, in the same manner as the baseline system 150. Further, the method 400 includes computing an SUT difference vector 620 for the vectors of performance records from the SUT 214, at block 412.

Accordingly, there now are two difference vectors—a first difference vector 620A from the baseline system 150 and a second difference vector 620B from the SUT 214. The method 400 includes comparing the two difference vectors 620 to identify any outlier performance records from the second difference vector 620B from the SUT 214, at block 414. The outlier performance records are those that have significantly different parameter values, at least for one of the performance parameters tracked. The significance difference can be determined using a predetermined threshold. Each performance parameter can be associated with a respective predetermined threshold. If the predetermined threshold is exceeded, that performance record is marked as an outlier.

In one or more embodiments of the present invention, the outliers can be identified using eigenvector calculations. For example, from each performance record from the first difference vector 620A, a relative magnitude of each delta for the performance parameters is calculated. This relative magnitude value is used as an identifier of a trait under question by using it as the predetermined threshold for that determining an outlier. Alternatively, or in addition, in one or more embodiments of the present invention, by applying multivariable differential equation constraints, the relative magnitude(s) can be used to correlate a likeliness value to the SUT 214. The likeness value can then be compared to the parameter values from the second difference vector 620B to identify the outlier performance records from the second difference vector 620B.

The method 400 further includes, using the outlier performance records to identify the type of problem from a set of known attack vectors, i.e., the root cause of one or soft failures in the SUT 214, at block 416. The outlier performance record(s) that is/are identified can provide the information to identify the root cause, for example, the performance parameter that is being over stressed in the SUT 214. By executing additional tests that debug that particular performance parameter, the root cause can be further localized and identified in one or more embodiments of the present invention. Alternatively, or in addition, inverse CTD can be used to further localize and identify the defect in case the stress tests are generated using CTD. Further yet, in one or more embodiments of the present invention, a manual review of the outlier performance record can facilitate the operator 110 or any other user to identify why the SUT 214 is experiencing the soft failure.

One or more embodiments of the present invention, accordingly, facilitate stress test impact isolation and mapping that can be used for identifying a root cause of a soft failure in a system under test. The technical features described herein provide a practical application that improves detection of a root cause of a soft failure in the system under test. Accordingly, the technical features herein facilitate an improvement to computing technology, particular, testing of a system that is executing large enterprise grade computer products that typically take a long time (weeks, months) for testing and diagnosing. Further, the technical features herein facilitate identifying the root cause without having the system to be taken offline. In one or more embodiments of the present invention, the stress tests can be executed sequentially, one at a time, and in parallel with other operations of the system. the technical features herein, accordingly, enhance the operation of the system under test and facilitate diagnosing the system efficiently and without disruption.

Figure 7:
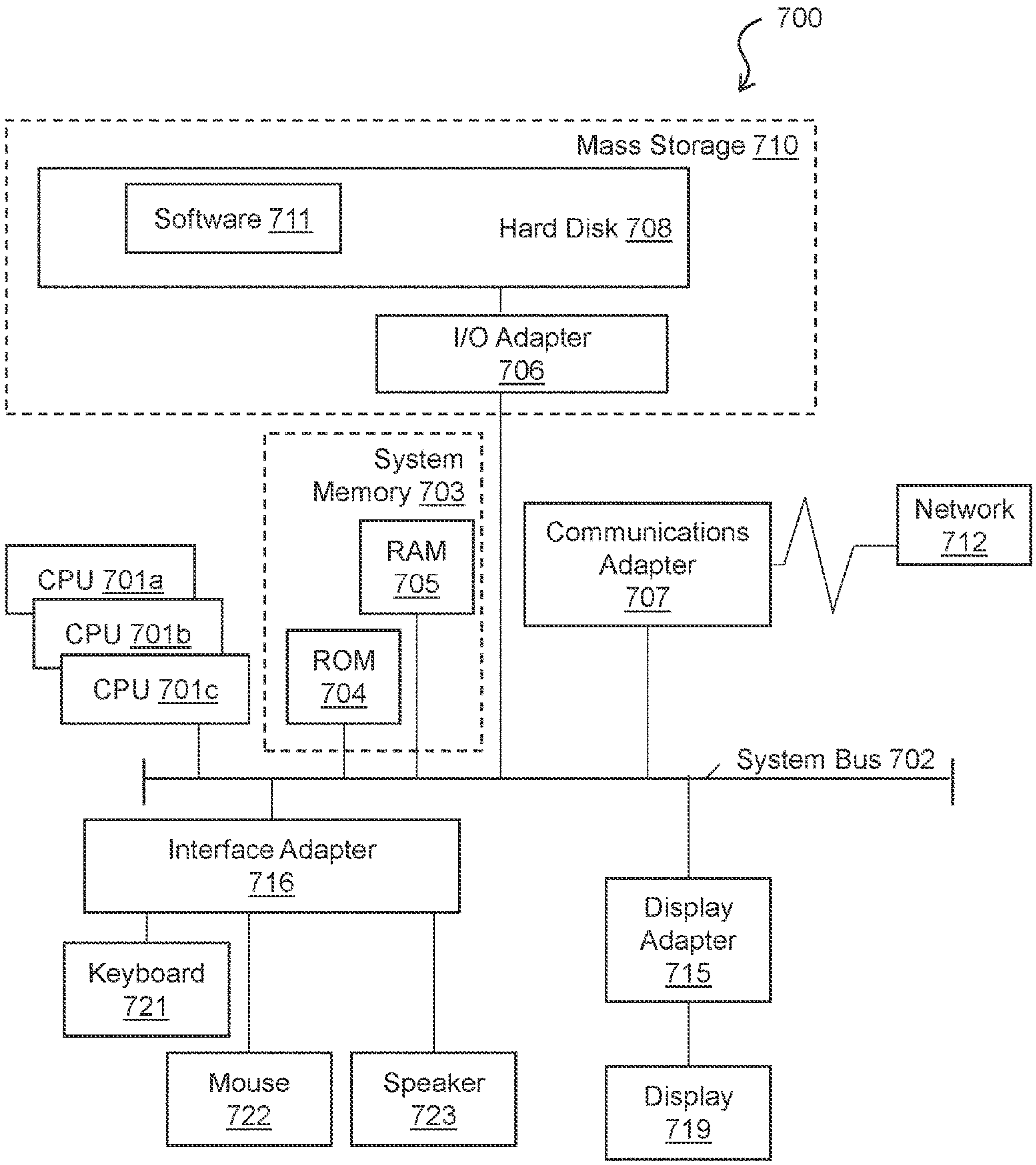
FIG. 7 depicts a computer system that may be used in one or more embodiments of the present invention.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701*a*, 701*b*, 701*c*, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission medium (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A method for testing a system under test (SUT) in an active environment to identify cause of a soft failure, the method comprising:

generating, by a testing system, a plurality of test cases for testing the SUT, the plurality of test cases generated based on a coverage model of the SUT, wherein the coverage model comprises a plurality of attributes;

recording, by the testing system, a first difference vector by executing the plurality of test cases on a baseline system, which is different from the SUT, and monitoring performance parameters of the baseline system before and after executing the plurality of test cases, wherein the first difference vector comprises a plurality of performance records corresponding respectively to the test cases, wherein each performance record comprises differences in the performance parameters of the baseline system from before and after the execution of a corresponding test case, the performance parameters comprising resource usage metrics of each of the plurality of test cases;

recording, by the testing system, a second difference vector by executing the plurality of test cases on the SUT and monitoring performance parameters of the SUT before and after executing the plurality of test cases, wherein the second difference vector also comprises a plurality of performance records corresponding respectively to the test cases, wherein each performance record comprises differences in the performance parameters of the SUT from before and after the execution of a corresponding test case;

identifying, by the testing system, an outlier performance record from the second difference vector by comparing the resource usage metrics from first difference vector and the resource usage metrics from the second difference vector, wherein the outlier performance record represents a test case that has different resource usage metrics on the SUT and the baseline system; and determining, by the testing system, a root cause of the soft failure of the SUT by executing an additional test case particular to the resource usage metrics and analyzing the additional test case corresponding in response to identifying the outlier performance record.

2. The method of claim 1, wherein each of the plurality of attributes has a set of possible values and wherein the coverage model defines possible combinations of values of the attributes as covered by the plurality of tests.

3. The method of claim 2, wherein the coverage model is a functional coverage model of the SUT.

4. The method of claim 1, wherein the plurality of tests is generated using combinatorial test design (CTD), and wherein analyzing the test case comprises using inverse CTD.

5. The method of claim 1, further comprising creating, by the testing system, a minimal set of tests from the plurality of tests by selecting tests that exceed a predetermined performance threshold, wherein creating the minimal set of tests comprises:

executing the plurality of tests on a baseline system;

recording a performance parameter of each of the plurality of the tests; and selecting a first test from the plurality of tests in the minimal set of tests based on the performance parameter exceeding the predetermined performance threshold.

6. The method of claim 5, wherein the performance parameter is one or more from a group of execution time, processor usage, memory usage, network usage, disk usage, power usage, and a combination thereof.

7. The method of claim 1, wherein the outlier performance record is identified using a set of predetermined thresholds, wherein each predetermined threshold is associated with a performance parameter that is recorded in the performance records.

8. A system comprising:

a memory device; and one or more processing units coupled with the memory device, the one or more processing units configured to perform a method comprising:

generating a plurality of test cases for testing a system under test (SUT) that is being executed in an active environment, the plurality of test cases generated based on a coverage model of the SUT, wherein the coverage model comprises a plurality of attributes;

recording a first difference vector by executing the plurality of test cases on a baseline system, which is different from the SUT, and monitoring performance parameters of the baseline system before and after executing the plurality of test cases, wherein the first difference vector comprises a plurality of performance records corresponding respectively to the test cases, wherein each performance record comprises differences in the performance parameters of the baseline system from before and after the execution of a corresponding test case, the performance parameters comprising resource usage metrics of each of the plurality of test cases;

recording a second difference vector by executing the plurality of test cases on the SUT and monitoring performance parameters of the SUT before and after executing the plurality of test cases, wherein the second difference vector also comprises a plurality of performance records corresponding respectively to the test cases, wherein each performance record comprises differences in the performance parameters of the SUT from before and after the execution of a corresponding test case;

identifying an outlier performance record from the second difference vector by comparing the resource usage metrics from first difference vector and the resource usage metrics from the second difference vector, wherein the outlier performance record represents a test case that has different resource usage metrics on the SUT and the baseline system; and determining a root cause of the soft failure of the SUT by executing an additional test case particular to the resource usage metrics and analyzing the additional test case corresponding in response to identifying the outlier performance record.

9. The system of claim 8, wherein each of the plurality of attributes has a set of possible values and wherein the coverage model defines possible combinations of values of the attributes as covered by the plurality of tests.

10. The system of claim 9, wherein the coverage model is a functional coverage model of the SUT.

11. The system of claim 8, wherein the plurality of tests is generated using combinatorial test design (CTD), and wherein analyzing the test case comprises using inverse CTD.

12. The system of claim 8, wherein the method further comprises creating a minimal set of tests from the plurality of tests by selecting tests that exceed a predetermined performance threshold, wherein creating the minimal set of tests comprises:

executing the plurality of tests on a baseline system;

recording a performance parameter of each of the plurality of the tests; and selecting a first test from the plurality of tests in the minimal set of tests based on the performance parameter exceeding the predetermined performance threshold.

13. The system of claim 12, wherein the performance parameter is one or more from a group of execution time, processor usage, memory usage, network usage, disk usage, power usage, and a combination thereof.

14. The system of claim 8, wherein the outlier performance record is identified using a set of predetermined thresholds, wherein each predetermined threshold is associated with a performance parameter that is recorded in the performance records.

15. A computer program product comprising a computer-readable storage media having computer-executable instructions stored thereupon, which when executed by a processor cause the processor to perform a method for testing a system under test (SUT) in an active environment, the method comprising:

generating a plurality of test cases for testing the SUT, the plurality of test cases generated based on a coverage model of the SUT, wherein the coverage model comprises a plurality of attributes;

recording a first difference vector by executing the plurality of test cases on a baseline system, which is different from the SUT, and monitoring performance parameters of the baseline system before and after executing the plurality of test cases, wherein the first difference vector comprises a plurality of performance records corresponding respectively to the test cases, wherein each performance record comprises differences in the performance parameters of the baseline system from before and after the execution of a corresponding test case, the performance parameters comprising resource usage metrics of each of the plurality of test cases;

recording a second difference vector by executing the plurality of test cases on the SUT and monitoring performance parameters of the SUT before and after executing the plurality of test cases, wherein the second difference vector also comprises a plurality of performance records corresponding respectively to the test cases, wherein each performance record comprises differences in the performance parameters of the SUT from before and after the execution of a corresponding test case;

identifying an outlier performance record from the second difference vector by comparing the resource usage metrics from first difference vector and the resource usage metrics from the second difference vector, wherein the outlier performance record represents a test case that has different resource usage metrics on the SUT and the baseline system; and determining a root cause of the soft failure of the SUT by executing an additional test case particular to the resource usage metrics and analyzing the additional test case corresponding in response to identifying the outlier performance record.

16. The computer program product of claim 15, wherein each of the plurality of attributes has a set of possible values and wherein the coverage model defines possible combinations of values of the attributes as covered by the plurality of tests.

17. The computer program product of claim 15, wherein the plurality of tests is generated using combinatorial test design (CTD), and wherein analyzing the test case comprises using inverse CTD.

18. The computer program product of claim 15, creating, by the testing system, a minimal set of tests from the plurality of tests by selecting tests that exceed a predetermined performance threshold, wherein creating the minimal set of tests comprises:

executing the plurality of tests on a baseline system;

recording a performance parameter of each of the plurality of the tests; and selecting a first test from the plurality of tests in the minimal set of tests based on the performance parameter exceeding the predetermined performance threshold.

19. The computer program product of claim 18, wherein the performance parameter is one or more from a group of execution time, processor usage, memory usage, network usage, disk usage, power usage, and a combination thereof.

20. The computer program product of claim 15, wherein the outlier performance record is identified using a set of predetermined thresholds, wherein each predetermined threshold is associated with a performance parameter that is recorded in the performance records.

* * * * *